US010102568B2

United States Patent
Mathur (10) Patent No.: US 10,102,568 B2
(45) Date of Patent: Oct. 16, 2018

(54) SYSTEM AND METHODS FOR MATCHING IMAGES WITH VIEWING ENVIRONMENT

(71) Applicant: THOMSON LICENSING, Issy-les-Moulineaux (FR)

(72) Inventor: Saurabh Mathur, Danville, CA (US)

(73) Assignee: THOMSON LICENSING, Issy-les-Moulineaux (FR)

( * ) Notice: Subject to any disclaimer, the term of this patent is extended or adjusted under 35 U.S.C. 154(b) by 417 days.

(21) Appl. No.: 14/784,730

(22) PCT Filed: Nov. 16, 2013

(86) PCT No.: PCT/US2013/070451
§ 371 (c)(1),
(2) Date: Oct. 15, 2015

(87) PCT Pub. No.: WO2014/200558
PCT Pub. Date: Dec. 18, 2014

(65) Prior Publication Data
US 2016/0063614 A1    Mar. 3, 2016

Related U.S. Application Data

(60) Provisional application No. 61/834,780, filed on Jun. 13, 2013.

(51) Int. Cl.
*G06Q 30/00* (2012.01)
*G06Q 30/06* (2012.01)
(Continued)

(52) U.S. Cl.
CPC ....... *G06Q 30/0643* (2013.01); *G06K 9/4652* (2013.01); *G06K 9/6201* (2013.01); *H04N 9/73* (2013.01)

(58) Field of Classification Search
CPC .... G06Q 30/0643; H04N 9/73; G06K 9/4652; G06K 9/6201
(Continued)

(56) References Cited

U.S. PATENT DOCUMENTS 6,693,647 B1 * 2/2004 Bernard .................... G06F 3/14
715/700
7,526,126 B2    4/2009 Oon et al.
(Continued)

FOREIGN PATENT DOCUMENTS

CN        1725866        12/2010
EP        2526688        11/2012
(Continued)

OTHER PUBLICATIONS

Search Report dated Feb. 7, 2014.

*Primary Examiner* — Yogesh C Garg
(74) *Attorney, Agent, or Firm* — Vincent E. Duffy (57) ABSTRACT

A system and methods are provided for matching images with viewing environment. A method includes accessing (410) a shopping site using a user device. The method further includes determining (415, 420) a viewing environment of a display on the user device. The method also includes receiving (430) an image depicting a product on the shopping site. The image is selected from a plurality of different images of the product taken under a plurality of different viewing environments and matches the viewing environment of the display on the user device. The method additionally includes showing (435) the image to a user on the display of the user device.

12 Claims, 5 Drawing Sheets

(51) Int. Cl.
*H04N 9/73* (2006.01)
*G06K 9/46* (2006.01)
*G06K 9/62* (2006.01)

(58) Field of Classification Search
USPC .............................................. 705/27.1, 27.2
See application file for complete search history.

(56) References Cited

U.S. PATENT DOCUMENTS

| | | | |
|---|---|---|---|
| 2003/0058253 A1* | 3/2003 | Edge | G06T 11/001 345/600 |
| 2005/0039140 A1* | 2/2005 | Chen | G06F 3/0482 715/810 |
| 2007/0260988 A1* | 11/2007 | Miller | H04N 5/44513 715/744 |
| 2011/0175925 A1 | 7/2011 | Kane et al. | |
| 2012/0233003 A1 | 9/2012 | Calman et al. | |
| 2017/0323185 A1* | 11/2017 | Bhardwaj | G06T 7/90 |

FOREIGN PATENT DOCUMENTS

| | | |
|---|---|---|
| WO | WO03054654 | 7/2003 |
| WO | WO2009137830 | 11/2009 |
| WO | WO2011090735 | 7/2011 |

* cited by examiner

SYSTEM AND METHODS FOR MATCHING IMAGES WITH VIEWING ENVIRONMENT

CROSS-REFERENCE TO RELATED APPLICATIONS

This application claims the benefit, under 35 U.S.C. § 365 of International Application PCT/US2013/070451, filed Nov. 16, 2013, which was published in accordance with PCT Article 21(2) on Dec. 18, 2014 in English and which claims the benefit of and priority to U.S. Provisional Patent Application No. 61/834,780, filed on Jun. 13, 2013 and entitled "SYSTEM AND METHOD TO MATCH IMAGES WITH A VIEWING ENVIRONMENT." The provisional and PCT applications are expressly incorporated by reference herein in their entirety for all purposes.

TECHNICAL FIELD

The present principles relate generally to image matching and, more particularly, to a system and methods for matching images with viewing environment.

BACKGROUND

More and more people are making purchases on the Internet via user devices such as personal computers, desktops and mobile devices. The mobile devices can include, for example, smartphones, tablets and laptops. However, one of the key problems with Internet based purchases from an online retailer is that the color of the items shown from a vendor can vary significantly from one user device to another. As a result of these color variances, a customer will end up buying an item where the color shown on the display of a user device will be different than how the item actually looks. Hence, the customer will end up returning the wrong colored item back to a vendor for an exchange or refund.

In order to show images on a web site that have accurate color as perceived by the user, calibration of the viewing device is typically required. Existing solutions include the use of hardware color calibration equipment that may be tedious to use by a lay person. In addition, these hardware calibration devices are expensive and typically used only by professionals. For casual users, this type of solution may not be acceptable due to the involved complexity and costs.

Figure 1:
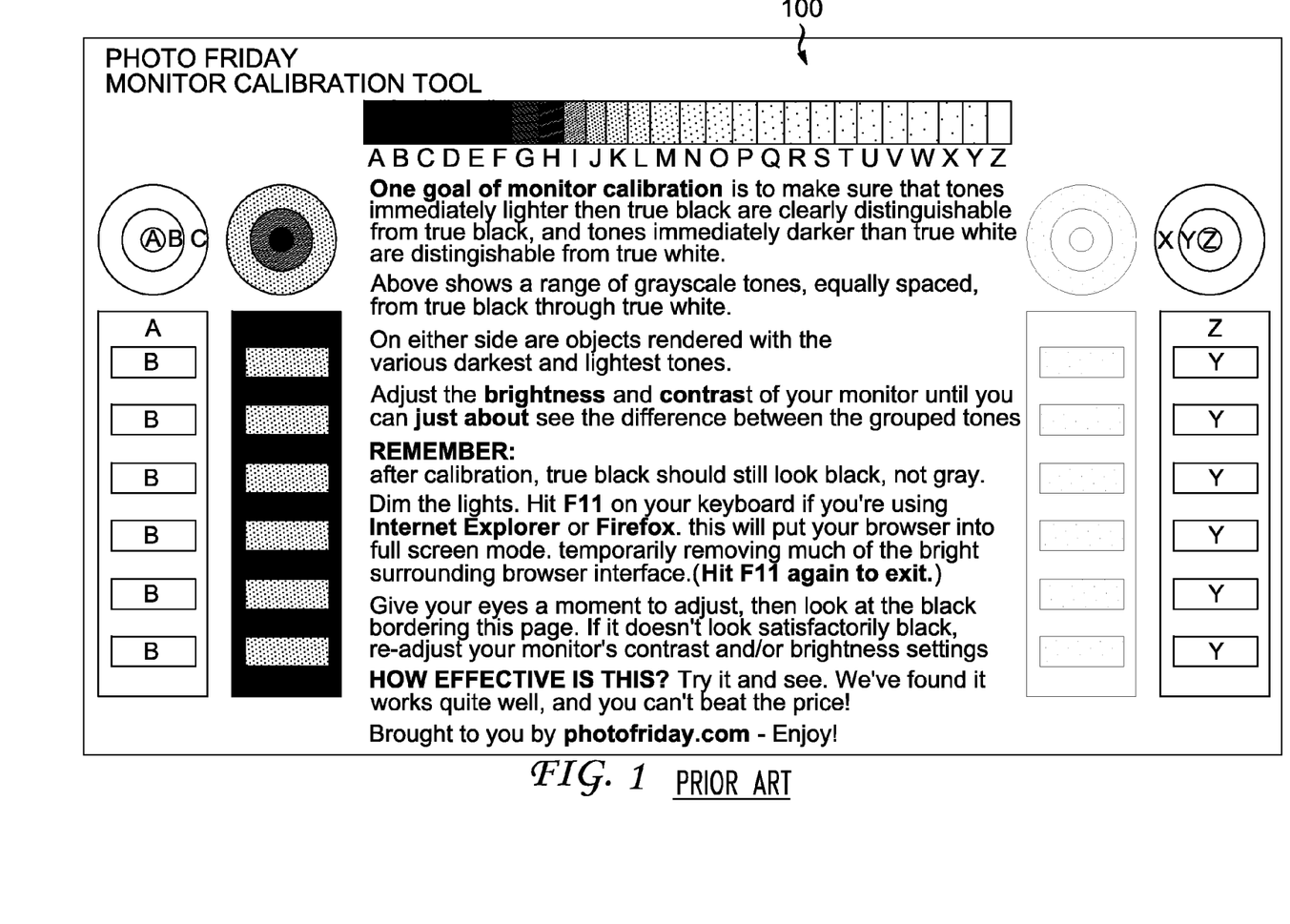
FIG. 1 shows a monitor calibration tool 100, in accordance with the prior art.

Other solutions do not use expensive hardware but show a series of patterns to the user and ask the user to adjust the settings of the display. FIG. 1 shows a monitor calibration tool 100, in accordance with the prior art. As is evident, the monitor calibration tool 100 is a time consuming and tedious way to calibrate a monitor. As such, the monitor calibration tool 100 is not likely to be used by casual users.

Moreover, while these types of solutions do not require expensive hardware, they do require the user to manually adjust the settings of their display. That is, in both of these cases, the user may have to recalibrate the display if the viewing environment changes (e.g., indoor vs. outdoor, bright versus dim, and so forth).

SUMMARY

These and other drawbacks and disadvantages of the prior art are addressed by the present principles, which are directed to a system and methods for matching images with viewing environment.

According to an aspect of the present principles, there is provided a method. The method includes accessing a shopping site using a user device. The method further includes determining a viewing environment of a display on the user device. The method also includes receiving an image depicting a product on the shopping site. The image is selected from a plurality of different images of the product taken under a plurality of different viewing environments and matches the viewing environment of the display on the user device. The method additionally includes showing the image to a user on the display of the user device.

According to another aspect of the present principles, there is provided a method. The method includes obtaining a plurality of images of a product under a plurality of different viewing environments. The product is available on a shopping site. The method further includes identifying a particular one of the plurality of images that match a viewing environment of a display of a user device. The method also includes sending the particular one of the plurality of images to the user device for displaying on the display of the user device.

According to yet another aspect of the present principles, there is provided a system. The system includes an image database for storing a plurality of images of a product taken under a plurality of different viewing environments. The product is available on a shopping site. The system further includes a user device for accessing the shopping site and providing an indication of a viewing environment of a display on the user device. The system also includes means for identifying a particular one of the plurality of images that matches the viewing environment of the display of the user device responsive to the indication. The system additionally includes means for providing the particular one of the plurality of images to the user device for display thereon.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

The present principles are directed to a system and methods for matching images with viewing environment.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Internet based shopping sites for products where color is important tend to have a high rate of product return because the color of the product as viewed on user device did not match with the color of the actual product. Such products can include, but are not limited to, clothes and shoes. As a result of the aforementioned color mismatch, such shopping sites (or the consumer) incur significant costs in shipping, handling, and warehousing of returned products. This also reduces user confidence and leads to fewer sales.

The present principles provide a solution to this problem by ensuring that both the user device and image of the product represent an accurate representation of the actual colors. One key element of the user's perception of color is the viewing environment which is primarily impacted by lighting levels.

For example, in a bright outdoor environment, the colors may look washed out while in a darker environment the colors may look over saturated. The type of lighting also has a major impact on the perception of color. For example, light emitting diode (LED) lighting versus incandescent lighting will cause users to perceive colors differently.

A web site can be provided that allows a user to select a viewing environment and then shows the image that is the closest match to that environment. To that end, several pictures of the same object (product) are taken under different viewing environments (conditions). This includes different types of lighting (LED, incandescent, fluorescent, and so forth) as well as different brightness levels (e.g., indoor versus outdoor and/or low versus medium versus high brightness and/or so forth). Table 1 lists some possible combinations of different lighting types versus different brightness levels. Of course, the present principles are not limited to the preceding examples and, thus, other combinations can also be used, while maintaining the spirit of the present principles. That is, other types of lighting and/or other brightness levels/metrics can be used in accordance with the teachings of the present principles, while maintaining the spirit of the present principles.

TABLE 1

| | Incandescent | Fluorescent | White LED |
|---|---|---|---|
| Low Brightness | | | |
| Medium Brightness | | | |
| High Brightness | | | |

In an embodiment, when the user is browsing a web site and looking at product images, the browser or web site allows the user to choose varying viewing conditions. This could be presented to the user as a drop down list, a slider or any other selection mechanism suitable for the user's device. Once the user selects a particular viewing condition, the web site presents the corresponding image to the user. In this way, the user can vary the viewing conditions and see how the color of the product varies.

In another embodiment, the process of selecting the viewing environment may be automated by using the camera on the user's device to measure the characteristics of the environment. Once the viewing environment is characterized, the web site then presents the image with the closest matching settings.

Figure 2:
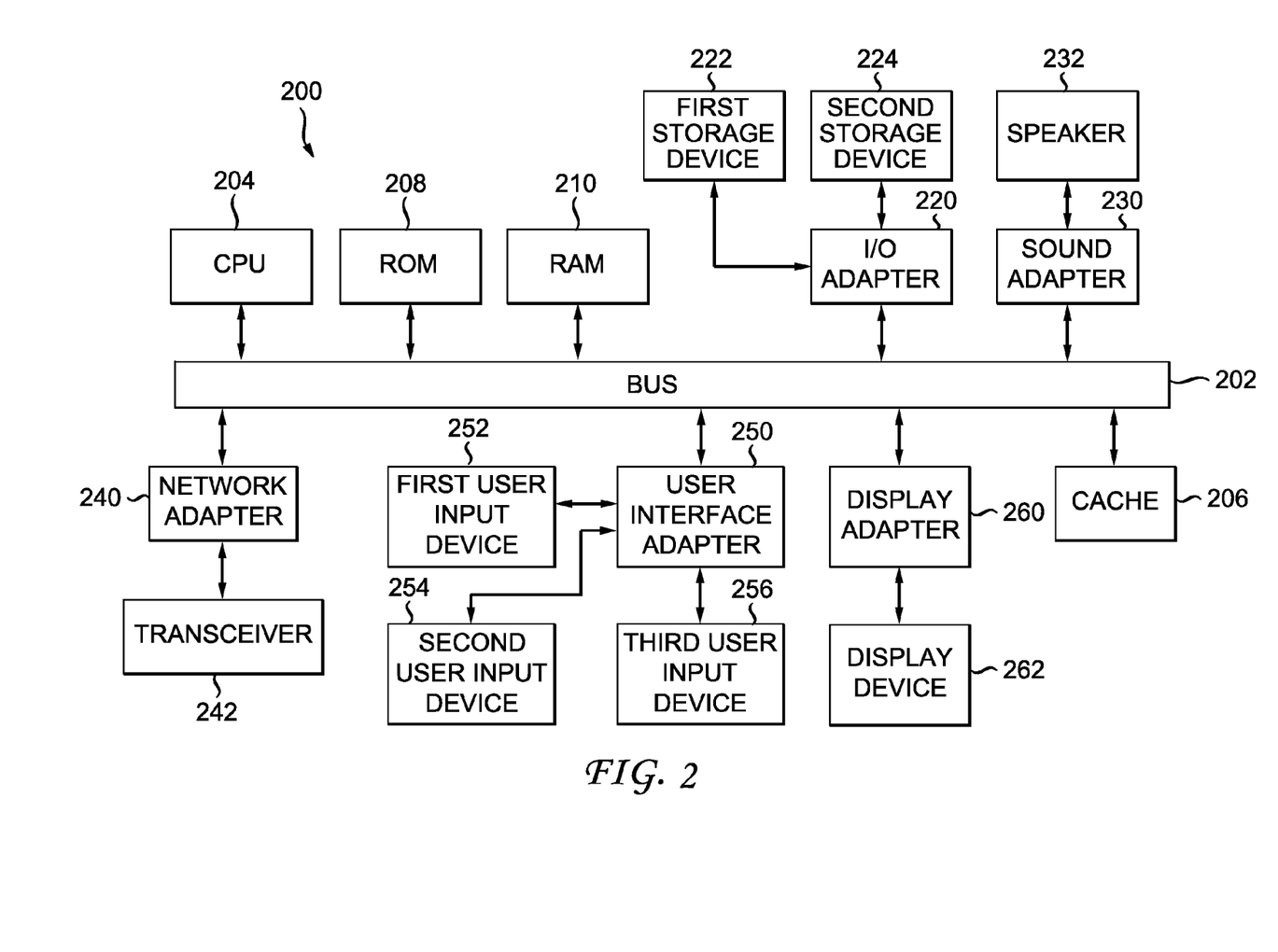
FIG. 2 shows an exemplary user device 200 to which the present principles may be applied, in accordance with an embodiment of the present principles.

FIG. 2 shows an exemplary user device 200 to which the present principles may be applied, in accordance with an embodiment of the present principles. The user device 200 includes at least one processor (CPU) 204 operatively coupled to other components via a system bus 202. A cache 206, a Read Only Memory (ROM) 208, a Random Access Memory (RAM) 210, an input/output (I/O) adapter 220, a sound adapter 230, a network adapter 240, a user interface adapter 250, and a display adapter 260, are operatively coupled to the system bus 202.

A first storage device 222 and (optionally) a second storage device 224 are operatively coupled to system bus 202 by the I/O adapter 220. The storage devices 222 and 224 may be any of a disk storage device (e.g., a magnetic or optical disk storage device), a solid state device, and so forth. The storage devices 222 and 224 may be the same type of storage device or different types of storage devices.

A speaker 232 is operatively coupled to system bus 202 by the sound adapter 230.

A transceiver 242 is operatively coupled to system bus 202 by network adapter 240.

A first user input device 252, a second user input device 254, and a third user input device 256 are operatively coupled to system bus 202 by user interface adapter 250. The user input devices 252, 254, and 256 can be any of a keyboard, a mouse, a keypad, an image capture device (e.g., a camera), a motion sensing device, a touchscreen, a microphone, a device incorporating the functionality of at least two of the preceding devices, and so forth. Of course, other types of input devices can also be used, while maintaining the spirit of the present principles. The user input devices 252, 254, and 256 can be the same type of user input device or different types of user input devices. The user input devices 252, 254, and 256 are used to input and output information to and from system 200.

A display device 262 is operatively coupled to system bus 202 by display adapter 260.

The user device 200 can be any of a personal computer, a desktop computer, a mobile device, and so forth. Exemplary mobile devices include, but are not limited to, smartphones, tablets, and laptops. Of course, the present principles are not limited to the preceding types of user devices and, thus, other types of user devices can also be used in accordance with the teachings of the present principles, while maintaining the spirit of the present principles.

Accordingly, some of the elements included below in the user device 200 may be omitted in some embodiments while other elements not shown may be included, depending upon the particular implementation of the user device. For example, various other input devices and/or output devices can be included in user device 200, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the user device 200 are readily contemplated by one of ordinary skill in the art given the teachings of the present principles provided herein.

Figure 3:
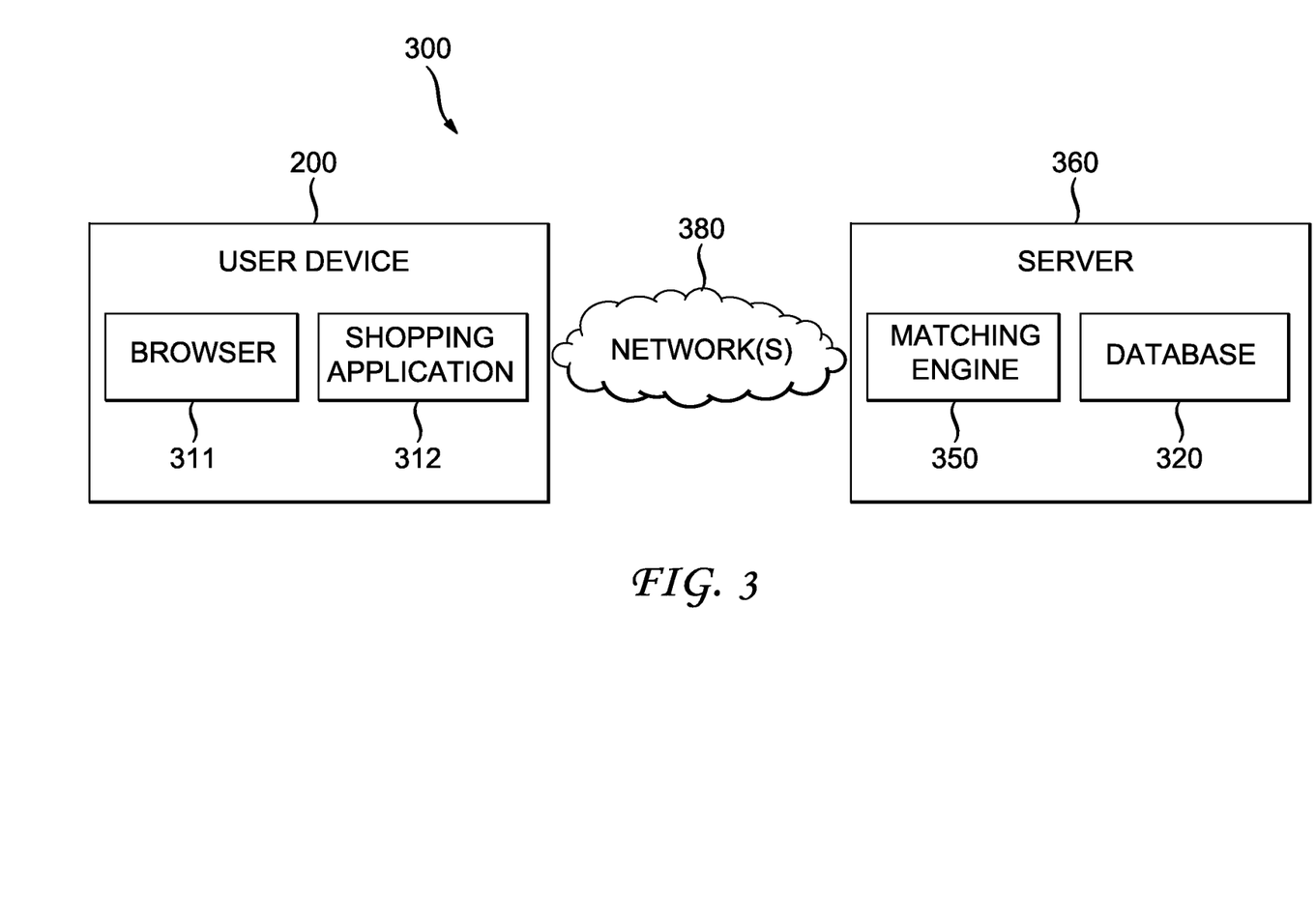
FIG. 3 shows a system 300 for matching images with viewing environment, in accordance with an embodiment of the present principles.

FIG. 3 shows a system 300 for matching images with viewing environment, in accordance with an embodiment of the present principles. The system 300 includes a web browser 311 and/or shopping application 312 and an image database 320. One or more user devices 200 can be considered to be part of the system 300 or can be considered to be machines that interact with the system 200.

The image database 320 can correspond to a retailer and can be managed by the retailer or some other entity to include product images for the retailer's website from which the products can be purchased, leased, and so forth.

The web browser 311 (having the capabilities described herein) can be already resident on the user device 200 or capable of being downloaded to the user device 200 for installation and use thereby in accordance with the teachings of the present principles.

The shopping application 312 can be already resident on the user device 200 or capable of being downloaded to the user device 200 for installation and use thereby in accordance with the teachings of the present principles. Alternatively, the shopping application 312 can be resident on, for example, a remote server 360 or other remote computing system accessible over one or more networks 380 and managed by the retailer or some other entity. In such a case, the shopping application 312 on the remote server 360 is accessible by, and/or otherwise interacts with, the browser 311 on the user device 200 (presuming the browser itself is not enabled in accordance with the teachings of the present principles as described herein, but simply operates as a conventional browser). The image database 320 can also be resident on, or local to, the server 360 or remote from the server 360, but accessible by the server 360 and/or browser 311 and/or shopping application 312. The web browser 311 or shopping application 312 or server 360 can include a matching engine 350 for matching one (or more) of a plurality of product images taken under different viewing environment with a viewing environment of the user device 200.

In the particular embodiment of FIG. 3, the web browser 311 and shopping application 312 are both enabled in accordance with the teachings of the present principles and included in the user device 200 for the sake of illustration. Of course, in other embodiments, only one of the web browser 311 and shopping application 312 need be used. The image database 320 and matching engine 350 are included in the server 360.

These and other implementations of the elements of system 300 are readily determined by one of ordinary skill in the art given the teachings of the present principles provided herein, while maintaining the spirit of the present principles. The interaction of the elements of system 300 will be described hereinafter with respect to FIGS. 4 and 5 that follow.

Figure 4:
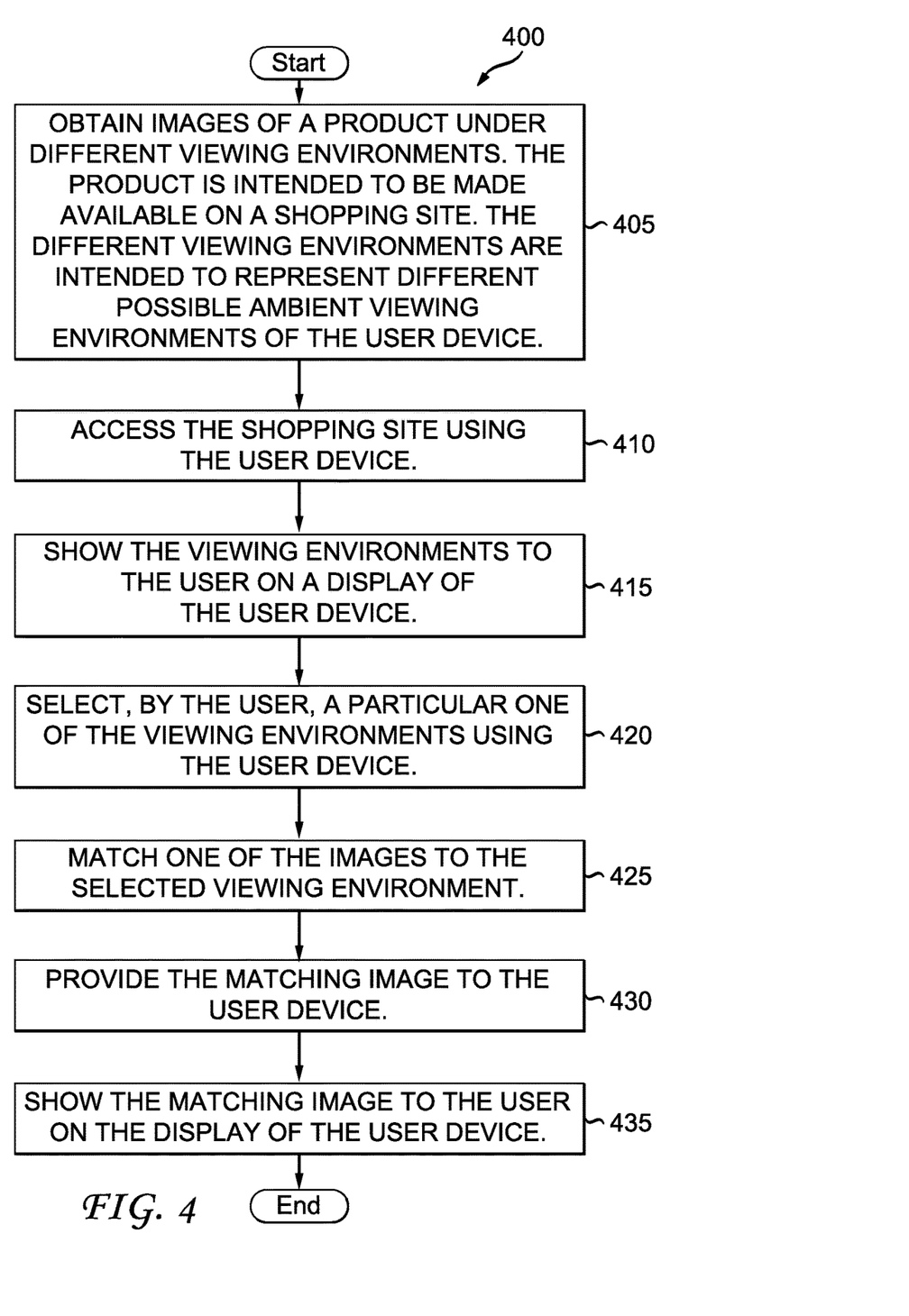
FIG. 4 shows a method 400 for matching images with a viewing environment, in accordance with an embodiment of the present principles.

FIG. 4 shows a method 400 for matching images with a viewing environment, in accordance with an embodiment of the present principles. At step 405, images are obtained of a product under different viewing environments. The product is intended to be made available on a shopping site. The different viewing environments are intended to represent different possible ambient viewing environments of a user device. At step 410, a user accesses the shopping site using the user device 200. At step 415, a web browser 311 or shopping application 312 shows the viewing environments to the user on a display 262 of the user device 200. At step 420, the user selects a particular one of the viewing environments using the user device 200. For example, a user input device (e.g., any of user input devices 252, 254, and/or 256) on the user device 200 can be used to make the selection. At step 425, the web browser 311 or shopping application 312 matches one of the images (depicting the product on the shopping site) to the selected viewing environment using an image database 320. At step 430, the web browser 311 or shopping application 312 provides the matching image to the user device 200. At step 435, the matching image is shown to the user on the display 262 of the user device 200.

Figure 5:
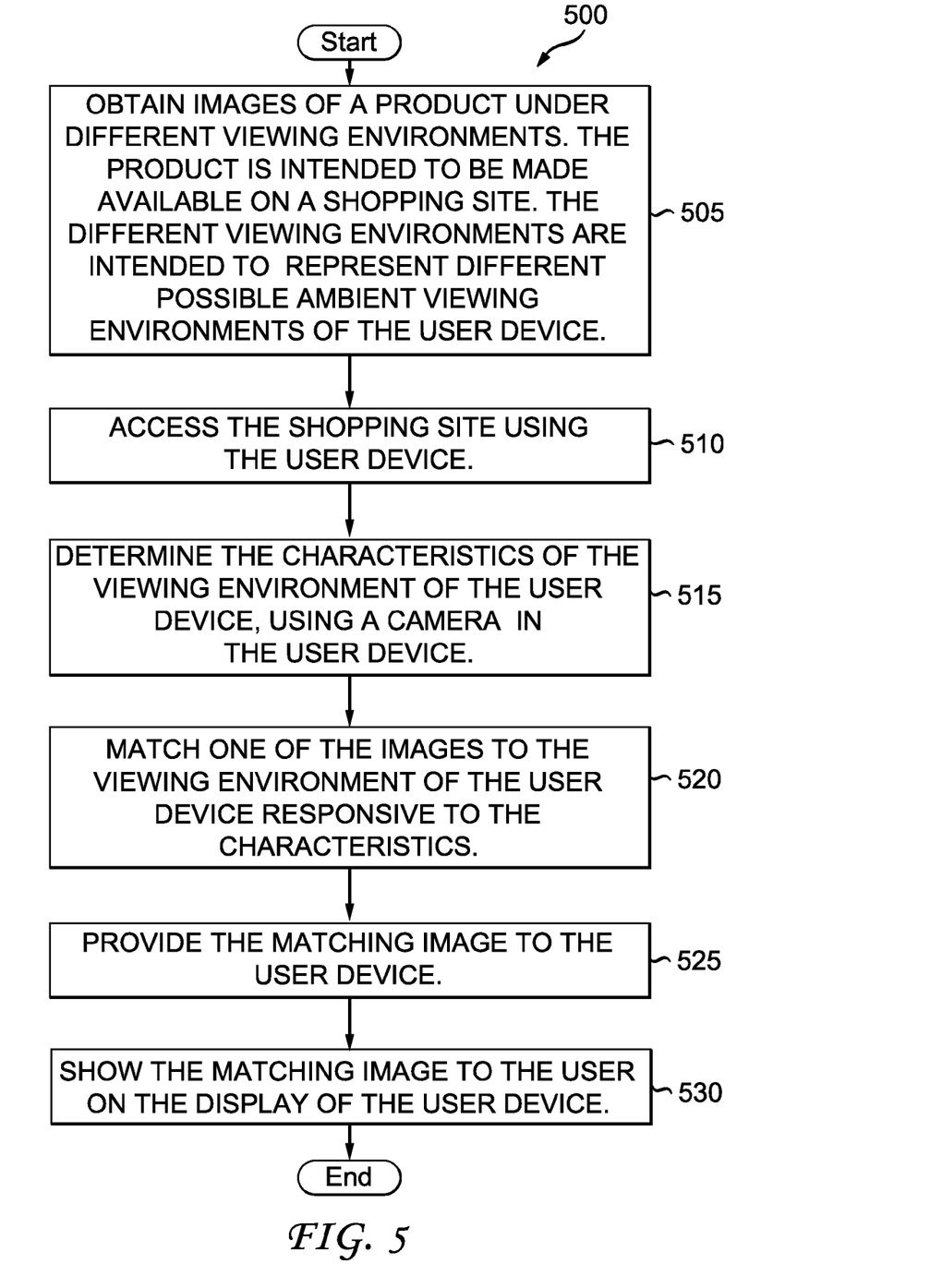
FIG. 5 shows another method 500 for matching images with a viewing environment, in accordance with an embodiment of the present principles.

FIG. 5 shows another method 500 for matching images with a viewing environment, in accordance with an embodiment of the present principles. At step 505, images are obtained of a product under different viewing environments. The product is intended to be made available on a shopping site. The different viewing environments are intended to represent different possible ambient viewing environments of a user device. At step 510, a user accesses a shopping site using a user device 200. At step 515, a camera in the user device 200 determines the characteristics of the viewing environment of the user device 200. At step 520, the web browser 311 or shopping application 312 matches the image (depicting a product on the shopping site) to the viewing environment of the user device 200 responsive to the characteristics using an image database 320. At step 525, the web browser 311 or shopping application 312 provides the matching image to the user device 200. At step 530, the matched image is shown to the user on the display 262 of the user device 200.

A description will now be given of some of the many attendant advantages/features of the present invention, some of which have been mentioned above. For example, one advantage/feature is a method that includes accessing a shopping site using a user device. The method further includes determining a viewing environment of a display on the user device. The method also includes receiving an image depicting a product on the shopping site. The image is selected from a plurality of different images of the product taken under a plurality of different viewing environments and matches the viewing environment of the display on the user device. The method additionally includes showing the image to a user on the display of the user device.

Another advantage/feature is the method as described above, wherein the determining step includes displaying the plurality of different viewing environments to the user on the display of the user device, and receiving a user selection of a particular one of the plurality of different viewing environments. The image is matched to the viewing environment responsive to the user selection.

Yet another advantage/feature is the method as described above, wherein the step of receiving a user selection includes receiving a plurality of user selections of various ones of the plurality of different viewing environments to enable the user to view the product in the various ones of the plurality of different viewing environments prior to purchasing or leasing the product.

Still another advantage/feature is the method as described above, wherein the determining step includes determining characteristics of the viewing environment of the display of the user device using a camera in the user device. The image is matched to the viewing environment responsive to the characteristics.

Moreover, another advantage/feature is the method described above, wherein the image is matched to the viewing environment responsive to a type of ambient lighting present at the user device.

Further, another advantage/feature is the method wherein the image is matched to the viewing environment responsive to a type of ambient lighting present at the user device as described above, and wherein the type of ambient lighting is selected or determined from among two or more of incandescent lighting, fluorescent lighting, and light emitting diode lighting.

Also, another advantage/feature is a method that includes obtaining a plurality of images of a product under a plurality of different viewing environments. The product is available on a shopping site. The method further includes identifying a particular one of the plurality of images that match a viewing environment of a display of a user device. The method also includes sending the particular one of the plurality of images to the user device for displaying on the display of the user device.

Additionally, another advantage/feature is the method as described above, further including providing a plurality of user-selectable viewing environments to the user device for showing on a display of the user device responsive to a user of the user device accessing the shopping site. Each of the plurality of user-selectable viewing environments represents a respective possible viewing environment of the display of the user device. The particular one of the plurality of images is identified responsive to a user selection of a particular one of the user-selectable viewing environments.

Moreover, another advantage/feature is the method as described above, further including receiving characteristics of the viewing environment of the display of the user device determined using a camera in the user device. The particular one of the plurality of images is identified responsive to the characteristics.

Further, another advantage/feature is the method as described above, wherein the particular one of the plurality of images is identified responsive to a type of ambient lighting present at the user device.

Also, another advantage/feature is the method wherein the particular one of the plurality of images is identified responsive to a type of ambient lighting present at the user device as described above, and wherein the type of ambient lighting is selected or determined from among two or more of incandescent lighting, fluorescent lighting, and light emitting diode lighting.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. A method, comprising:
accessing a shopping site using a user device;
determining a viewing environment of a display on the user device;
receiving an image depicting a product on the shopping site, the image selected from a plurality of different images of the product taken under a plurality of different viewing environments and matching the viewing environment of the display on the user device; and
showing the image to a user on the display of the user device, wherein
the determining step comprises determining a characteristic of the viewing environment of the display of the user device using a camera in the user device, and
the image is matched to the viewing environment responsive to the characteristic.

2. The method of claim 1, wherein said determining step comprises:
displaying the plurality of different viewing environments to the user on the display of the user device; and
receiving a user selection of a particular one of the plurality of different viewing environments,
wherein the image is matched to the viewing environment responsive to the user selection.

3. The method of claim 1, wherein said step of receiving a user selection comprises receiving a plurality of user selections of various ones of the plurality of different viewing environments to enable the user to view the product in the various ones of the plurality of different viewing environments prior to purchasing or leasing the product.

4. The method of claim 1, wherein the image is matched to the viewing environment responsive to a type of ambient lighting present at the user device.

5. The method of claim 4, wherein the type of ambient lighting is selected or determined from among two or more of incandescent lighting, fluorescent lighting, light emitting diode lighting, and natural lighting conditions.

6. A method, comprising:
obtaining a plurality of images of a product under a plurality of different viewing environments, the product being available on a shopping site;
receiving a characteristic of the viewing environment of a display of a user device determined using a camera in the user device;
identifying a particular one of the plurality of images that match a viewing environment of the display of the user device, wherein the particular one of the plurality of images is identified responsive to the characteristic; and
sending the particular one of the plurality of images to the user device for displaying on the display of the user device.

7. The method of claim 6, further comprising providing a plurality of user-selectable viewing environments to the user device for showing on a display of the user device responsive to a user of the user device accessing the shopping site, each of the plurality of user-selectable viewing environments representing a respective possible viewing environment of the display of the user device,
wherein the particular one of the plurality of images is identified responsive to a user selection of a particular one of the user-selectable viewing environments.

8. The method of claim 6, wherein the particular one of the plurality of images is identified responsive to a type of ambient lighting present at the user device.

9. The method of claim 8, wherein the type of ambient lighting is selected or determined from among two or more of incandescent lighting, fluorescent lighting, light emitting diode lighting, and natural lighting conditions.

10. A system, comprising:
an image database for storing a plurality of images of a product taken under a plurality of different viewing environments, the product being available on a shopping site;
a user device for accessing the shopping site and providing an indication of a viewing environment of a display on the user device;
means for identifying a particular one of the plurality of images that matches the viewing environment of the display of the user device responsive to the indication;
means for providing the particular one of the plurality of images to the user device for display thereon, wherein
the user device determines a characteristic of the viewing environment of the display of the user device determined using a camera in the user device, and forwards the characteristic as the indication to the means for identifying.

11. The system of claim 10, wherein the user device displays the plurality of different viewing environments to the user on the display of the user device, receives a user selection of a particular one of the plurality of different viewing environments, and forwards the user selection as the indication to the means for identifying.

12. The system of claim 10, wherein the particular one of the plurality of images is identified responsive to a type of ambient lighting present at the user device.

* * * * *